(12) United States Patent
Alleyne (10) Patent No.: US 7,536,476 B1
(45) Date of Patent: May 19, 2009

(54) METHOD FOR PERFORMING TREE BASED ACL LOOKUPS

(75) Inventor: Brian Derek Alleyne, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 830 days.

(21) Appl. No.: 10/745,067

(22) Filed: Dec. 22, 2003

Related U.S. Application Data (60) Provisional application No. 60/435,397, filed on Dec. 20, 2002.

(51) Int. Cl.
| | |
|---|---|
| *G06F 15/16* | (2006.01) |
| *G06F 15/173* | (2006.01) |
| *G06F 9/46* | (2006.01) |
| *G06F 17/30* | (2006.01) |
| *G01R 31/08* | (2006.01) |
| *H04J 3/14* | (2006.01) |
| *H04J 1/16* | (2006.01) |
| *H04L 12/28* | (2006.01) |
| *H04L 12/56* | (2006.01) |
| *G06F 9/00* | (2006.01) |
| *G06F 17/00* | (2006.01) |
| *G06F 11/00* | (2006.01) |
| *G06F 7/00* | (2006.01) |
| *G08C 15/00* | (2006.01) |
| *H04L 1/00* | (2006.01) |
| *H04L 12/26* | (2006.01) |

(52) U.S. Cl. ........................ 709/238; 709/225; 709/229; 709/245; 709/249; 726/12; 726/13; 726/14; 718/105; 370/238; 370/392; 707/7; 707/10

(58) Field of Classification Search ................. 709/203, 709/218, 225, 226, 229, 236, 238, 241, 245, 709/249; 726/11–15; 718/105; 370/238, 370/389, 392, 395.31; 707/6, 7, 9, 10, 104.1
See application file for complete search history.

(56) References Cited

U.S. PATENT DOCUMENTS

| | | | |
|---|---|---|---|
| 5,471,592 | A | 11/1995 | Gove et al. |
| 5,524,258 | A | 6/1996 | Corby, Jr. et al. |
| 5,677,851 | A * | 10/1997 | Kingdon et al. ............. 709/229 |
| 5,734,649 | A | 3/1998 | Carvey et al. |
| 5,781,772 | A | 7/1998 | Wilkinson, III et al. |

(Continued)

OTHER PUBLICATIONS

Myers, J. "IMAP4 ACL Extension," RFC 2086, Jan. 1997, pp. 1-8.*

(Continued)

*Primary Examiner*—Larry D Donaghue
*Assistant Examiner*—Melvin H Pollack
(74) *Attorney, Agent, or Firm*—Schwegman, Lundberg & Woessner, P.A.

(57) ABSTRACT

A method for performing a lookup of a packet against an access control list. In one example, the method includes receiving an access control list, partioning said list into two or more complementary sets, and for each set, forming a tree having one or more end nodes including filtering rules, and internal nodes representing decision points, thereby forming at least two trees. In one example, when a packet arrives, the two or more trees are traversed using the packet header information, wherein the decision points in the internal nodes are used to guide the packet selection down the trees to an end node.

16 Claims, 6 Drawing Sheets

U.S. PATENT DOCUMENTS

| | | | |
|---|---|---|---|
| 5,787,430 | A | 7/1998 | Doeringer et al. |
| 5,802,278 | A | 9/1998 | Isfeld et al. |
| 5,838,894 | A | 11/1998 | Horst |
| 5,878,415 | A * | 3/1999 | Olds ............................ 707/9 |
| 5,905,725 | A | 5/1999 | Sindhu et al. |
| 5,909,440 | A | 6/1999 | Ferguson et al. |
| 5,920,699 | A | 7/1999 | Bare |
| 5,923,643 | A | 7/1999 | Higgins et al. |
| 5,930,256 | A | 7/1999 | Greene et al. |
| 6,011,795 | A | 1/2000 | Varghese et al. |
| 6,018,524 | A | 1/2000 | Turner et al. |
| 6,078,963 | A | 6/2000 | Civaniar et al. |
| 6,091,725 | A | 7/2000 | Cheriton et al. |
| 6,101,192 | A | 8/2000 | Wakeland |
| 6,161,139 | A * | 12/2000 | Win et al. .................... 709/225 |
| 6,192,405 | B1 * | 2/2001 | Bunnell ..................... 709/225 |
| 6,212,184 | B1 | 4/2001 | Venkatachary et al. |
| 6,308,219 | B1 | 10/2001 | Hughes |
| 6,430,181 | B1 | 8/2002 | Tuckey |
| 6,453,413 | B1 | 9/2002 | Chen et al. |
| 6,526,055 | B1 | 2/2003 | Perlman et al. |
| 6,614,789 | B1 | 9/2003 | Yazdani et al. |
| 6,631,419 | B1 * | 10/2003 | Greene ....................... 709/238 |
| 6,658,002 | B1 * | 12/2003 | Ross et al. .................. 370/392 |
| 6,675,187 | B1 | 1/2004 | Greenberger |
| 6,687,781 | B2 | 2/2004 | Wynne et al. |
| 6,697,875 | B1 | 2/2004 | Wilson |
| 6,721,316 | B1 | 4/2004 | Epps et al. |
| 6,731,633 | B1 | 5/2004 | Sohor et al. |
| 6,732,203 | B2 | 5/2004 | Kanapathippillai et al. |
| 6,751,191 | B1 | 6/2004 | Kanekar et al. |
| 6,778,490 | B1 | 8/2004 | Achilles et al. |
| 6,785,728 | B1 * | 8/2004 | Schneider et al. ........... 709/229 |
| 6,795,886 | B1 | 9/2004 | Nguyen |
| 6,801,950 | B1 | 10/2004 | O'Keeffe et al. |
| 6,804,815 | B1 | 10/2004 | Kerr et al. |
| 6,859,455 | B1 | 2/2005 | Yazdani et al. |
| 6,879,559 | B1 | 4/2005 | Blackmon et al. |
| 6,920,456 | B2 * | 7/2005 | Lee et al. .................... 707/101 |
| 6,922,724 | B1 * | 7/2005 | Freeman et al. ............. 709/223 |
| 6,944,183 | B1 * | 9/2005 | Iyer et al. ................... 370/466 |
| 6,944,860 | B2 * | 9/2005 | Schmidt ..................... 718/100 |
| 6,954,220 | B1 * | 10/2005 | Bowman-Amuah ......... 715/741 |
| 6,961,783 | B1 * | 11/2005 | Cook et al. ................. 709/245 |
| 6,965,615 | B1 | 11/2005 | Kerr et al. |
| 6,973,488 | B1 * | 12/2005 | Yavatkar et al. ............. 709/223 |
| 6,990,527 | B2 * | 1/2006 | Spicer et al. ................ 709/229 |
| 7,006,431 | B1 | 2/2006 | Kanekar et al. |
| 7,020,718 | B2 * | 3/2006 | Brawn et al. ................ 709/238 |
| 7,024,693 | B2 * | 4/2006 | Byrne ......................... 726/21 |
| 7,028,098 | B2 * | 4/2006 | Mate et al. .................. 709/238 |
| 7,031,320 | B2 | 4/2006 | Choe |
| 7,043,494 | B1 * | 5/2006 | Joshi et al. ................. 707/101 |
| 7,051,039 | B1 * | 5/2006 | Murthy et al. .............. 707/102 |
| 7,051,078 | B1 * | 5/2006 | Cheriton .................... 709/214 |
| 7,054,315 | B2 * | 5/2006 | Liao ........................... 370/392 |
| 7,054,944 | B2 * | 5/2006 | Tang et al. .................. 709/229 |
| 7,069,372 | B1 | 6/2006 | Leung, Jr. et al. |
| 7,069,536 | B2 * | 6/2006 | Yaung ........................ 717/102 |
| 7,073,196 | B1 * | 7/2006 | Dowd et al. ................. 726/14 |
| 7,095,713 | B2 | 8/2006 | Willhite et al. |
| 7,096,499 | B2 * | 8/2006 | Munson ...................... 726/23 |
| 7,103,708 | B2 * | 9/2006 | Eatherton et al. ........... 711/108 |
| 7,111,071 | B1 | 9/2006 | Hooper |
| 7,124,203 | B2 * | 10/2006 | Joshi et al. .................. 709/248 |
| 7,139,238 | B2 | 11/2006 | Hwang |
| 7,150,015 | B2 * | 12/2006 | Pace et al. ................... 717/176 |
| 7,155,518 | B2 * | 12/2006 | Forslow ..................... 709/227 |
| 7,159,125 | B2 * | 1/2007 | Beadles et al. .............. 713/193 |
| 7,167,918 | B2 * | 1/2007 | Byrne et al. ................. 709/229 |
| 7,185,192 | B1 * | 2/2007 | Kahn .......................... 713/155 |
| 7,185,365 | B2 * | 2/2007 | Tang et al. .................... 726/13 |
| 7,200,144 | B2 * | 4/2007 | Terrell et al. ................. 370/389 |
| 7,200,865 | B1 * | 4/2007 | Roscoe et al. ................. 726/12 |
| 7,203,171 | B1 * | 4/2007 | Wright .................... 370/236.1 |
| 7,225,204 | B2 * | 5/2007 | Manley et al. .............. 707/200 |
| 7,225,256 | B2 * | 5/2007 | Villavicencio .............. 709/225 |
| 7,225,263 | B1 * | 5/2007 | Clymer et al. .............. 709/229 |
| 7,227,842 | B1 * | 6/2007 | Ji et al. ........................ 370/235 |
| 7,230,912 | B1 | 6/2007 | Ghosh et al. |
| 7,231,661 | B1 * | 6/2007 | Villavicencio et al. .......... 726/4 |
| 7,239,639 | B2 * | 7/2007 | Cox et al. .............. 370/395.43 |
| 7,249,374 | B1 * | 7/2007 | Lear et al. ...................... 726/6 |
| 7,257,815 | B2 * | 8/2007 | Gbadegesin et al. ......... 718/104 |
| 7,274,702 | B2 | 9/2007 | Toutant et al. |
| 7,280,975 | B1 * | 10/2007 | Donner ........................ 705/10 |
| 7,302,701 | B2 * | 11/2007 | Henry ......................... 726/11 |
| 7,308,495 | B2 | 12/2007 | Ishiyama et al. |
| 7,315,900 | B1 | 1/2008 | Ofelt et al. |
| 7,355,970 | B2 * | 4/2008 | Lor ........................... 370/231 |
| 7,450,438 | B1 | 11/2008 | Holst et al. |
| 7,453,883 | B1 | 11/2008 | Lynch et al. |
| 2002/0035639 | A1 * | 3/2002 | Xu ............................ 709/238 |
| 2003/0005178 | A1 * | 1/2003 | Hemsath ..................... 709/328 |
| 2003/0056001 | A1 * | 3/2003 | Mate et al. .................. 709/238 |
| 2003/0108056 | A1 | 6/2003 | Sindhu et al. |
| 2003/0163589 | A1 | 8/2003 | Bunce et al. |
| 2003/0188192 | A1 * | 10/2003 | Tang et al. .................. 713/201 |
| 2003/0208597 | A1 * | 11/2003 | Belgaied ..................... 709/225 |
| 2003/0212806 | A1 * | 11/2003 | Mowers et al. .............. 709/229 |
| 2003/0212900 | A1 * | 11/2003 | Liu et al. .................... 713/200 |
| 2004/0024888 | A1 * | 2/2004 | Davis et al. ................. 709/229 |
| 2006/0117126 | A1 | 6/2006 | Leung et al. |
| 2006/0159034 | A1 | 7/2006 | Talur et al. |

OTHER PUBLICATIONS

Stokes, E. et al. "Access Control Requirements for LDAP," RFC 2820, May 2000, pp. 1-9.*
Ballardie, A. "Core Based Trees (CBT) Multicast Routing Architecture," RFC 2201, Sep. 1997, pp. 1-15.*
Kille, S. "Representing the O/R Address Heirarchy in the X.500 Directory Information Tree," RFC 2294, Mar. 1998, pp. 1-13.*
Wijnen, B. et al. "View-Based Access Control Model (VACM) for the Simple Network Management Protocol (SNMP)," RFC 2575, Apr. 1999, pp. 1-38.*
Finseth, C. "An Access Control Protocol, Sometimes Called TACACS," RFC 1492, Jul. 1993, pp. 1-21.*
Gladney, H. M. "Access Control for Large Collections," ACM Transactions on Information Systems (TOIS), vol. 15, Issue 2, Apr. 1997, pp. 154-194.*
Gupta, Pankaj and McKeown, Nick. "Packet Classification using Hierarchical Intelligent Cuttings," IEEE Micro, 2000, pp. 1-9.*
Saltzer, Jerome H. "Protection and the Control of Information Sharing in Multics," Communications of the ACM, vol. 17, Issue 7, Jul. 1974, pp. 388-402.*
Czerwinski, Steven E. et al. "An Architecture for a Secure Service Discovery Service," 5th Annual ACM/IEEE International Conference on Mobile Computing and Networking, 1999, pp. 24-35.*
Kim, Tae-Hoon and Shin, Yeong Gil. "Role-Based Decomposition for Improving Concurrency in Distributed Object-Oriented Software Development Environments," 23rd Annual International Computer Software and Applications Conference (COMPSAC), Oct. 29, 1999, pp. 410-415.*
Ganti, V. et al. "Mining Very Large Databases," Computer, vol. 32, Issue 8, Aug. 1999, pp. 38-45.*
Gong, L. "A Secure Identity-Based Capability System," IEEE Symposium on Security and Privacy, May 1-3, 1989, pp. 56-63.*
U.S. Appl. No. 11/318,217, filed Dec. 23, 2005, Method for Providing Loop Free Routing Table in a Router.
U.S. Appl. No. 10/177,496, filed Jun. 20, 2002, Packet Routing and Switching Device.
U.S. Appl. No. 10/414,135, filed Apr. 14, 2003, Scalable Packet Routing and Switching Device and Method.

U.S. Appl. No. 10/414,133, filed Apr. 14, 2003, Redundant Packet Routing and Switching Device and Method.

"What's Inside a Router?", http://www-net.cs.umass.edu/kurose/network/inside/inside.htm, (observed Aug. 29, 2005), 11 pgs.

"Xelerated Packet Devices", *MicroDesign Resources Presentation, Network Processor Forum*, (Jun. 14, 2001), 11 pgs.

Belenkiy, A., "Deterministic IP Table Lookup at Wire Speed", *The Internet Global Summit (INET'99)*, http://www.isoc.org/inet99/proceedings/4j/4j_2.htm, (observed May 12, 2003), 18 pgs.

Cataldo, A., "Net Processor Startup Takes Pipelined Path to 40 Gbits/s", EETimes.com, (Jul. 2, 2001), 2 pgs.

Chiueh, T.-C., et al., "High-Performance IP Routing Table Lookup Using CPU Caching", *Proceedings, Eighteenth Annual Joint Conference of the IEEE Computer and Communication Societies (INFOCOM '99)*, vol. 3, (1999), 1421-1428.

Degermark, M, et al., "Small Forwarding Tables for Fast Routing Lookups", *Proceedings, ACM SIGCOMM '97*, (1997),3-14.

Gupta, P., et al., "Classifying Packets With Hierarchical Intelligent Cuttings", *IEEE Micro*, 21(1), (Jan./Feb. 2000), 34-41.

Gupta, P., et al., "Packet Classification on Multiple Fields", *Proceedings of the Conference on Applications, Technologies, Architectures, and Protocols for Computer Communication (ACM SIGCOMM '99)*, (1999), 147-160.

Gupta, A., et al., "Routing Lookups in Hardware at Memory Access Speeds", *Proceedings, Seventeen Annual Joint Conference of the IEEE Computer and Communications Societies (INFOCOM '98)*, vol. 3, (1998), 1240-1247.

Kung, H. T., et al., "Algorithms for VLSI Processor Arrays", *In: Introduction to VLSI Systems*, Mead, C., et al., Editors, Addision-Wesley, Reading, MA,(1980), 271-292.

Lakshman, T. V., et al., "High-Speed Policy-Based Packet Forwarding Using Efficient Multi-Dimensional Range Matching", *Proceedings of the Conference on Applications, Technologies, Architectures, and Protocols for Computer Communications (ACM SIGCOMM '98)*, (1998),203-214.

Lampson, B., et al., "IP Lookups Using Multiway and Multicolumn Search", *IEEE/ACM Transactions on Networking*, 7(3), (Jun. 1999),324-334.

Lindberg, K., "Multi-Gigabit Routers", *Proceedings, HUT Internetworking Seminar*, http://www.tml.hut.fi/Opinnot/Tik-110.551/1998/papers/02MultiGigabitRouter/_paper.html, (observed May 12, 1998), 14 pgs.

McAuley, A. J., et al., "Fast Routing Table Lookup Using CAMs", *Proceedings, Twelfth Annual Joint Conference of the IEEE Computer and Communications Societies, Networking: Foundation for the Future (INFOCOM '93)*, vol. 3, (1993), 1382-1391.

Partridge, C., et al., "A 50-Gb/s IP Router", *IEEE/ACM Transactions on Networking*, 6(3), (Jun. 1998), 237-248.

Qui, L., et al., "Fast Firewall Implementations for Software and Hardware-Based Routers", *Microsoft Technical Report MSR-TR-2001-61*, (Jun. 2001), 18 pgs.

Srinivasan, V., et al., "Fast and Scalable Layer Four Switching", *Proceedings of the Conference on Applications, Technologies, Architectures, and Protocols for Computer Communications (ACM SIGCOMM '98)*, (1998), 191-202.

Srinivasan, V., et al., "Packet Classification Using Tuple Space Search", *Proceedings of the Conference on Applications, Technologies, Architectures, and Protocols (ACM SIGCOMM '99)*, (1999), 135-146.

Waldvogel, M., et al., "Scalable High Speed IP Routing Lookups", *Proceedings, ACM SIGCOMM '97*, (1997), 25-36.

"U.S. Appl. No. 10/414,133, Response filed Oct. 29, 2007 to Final Office Action mailed Aug. 8, 2007", 9 pgs.

"U.S. Appl. No. 10/177,496, Preliminary Amendment filed Jun. 12, 2007", 10 p.

"U.S. Appl. No. 10/177,496, Response filed May 15, 2007 to Final Office Action mailed Feb. 15, 2007", 11 p.

"U.S. Appl. No. 10/414,133, Non-Final Office Action mailed Feb. 23, 2007", 11 p.

"U.S. Appl. No. 10/414,133, Response filed May 22, 2007 to Non-Final office Action mailed Feb. 23, 2007", 9 p.

"U.S. Appl. No. 10/414,135, Non-Final Office Action mailed Mar. 8, 2007", 10 p.

"U.S. Appl. No. 10/414,135, Response filed Jun. 5, 2007 to Non-Final Office Action mailed Mar. 8, 2007", 10 p.

"U.S. Appl. No. 10/414,135, Response filed Oct. 31, 2007 to Final Office Action mailed Sep. 11, 2007", 10 pgs.

* cited by examiner

METHOD FOR PERFORMING TREE BASED ACL LOOKUPS

CROSS REFERENCE TO RELATED APPLICATION

This application claims the benefit under 35 U.S.C. § 119 (e) of U.S. Provisional Patent Application No. 60/435,397, filed Dec. 20, 2002, entitled "METHOD FOR PERFORMING TREE BASED ACL LOOKUPS" the disclosure of which is hereby incorporated by reference herein in its entirety.

FIELD OF THE INVENTION

This invention relates, in general, to routers, and more particularly, to access control lists used within routers.

BACKGROUND

An Access Control List (ACL) includes a plurality of Filtering Rules (FRs) for packet classification. The FRs are used in firewalls implemented within a router and are used to determine an action to be performed with regard to a received packet based on the classification. Information from the packet's header is compared against the FRs in order to determine if the packet falls within the scope of one or more of the FRs.

Each filtering rule or filter may include one or more of the fields listed in Table I, and the rules specify how each field should be mapped or compared with the packet header. Typically, the source/destination IP address is specified by a prefix/mask of the packet, and the source/destination port numbers are specified by a range. A given packet can match several of the filters in the database, so each filter is given a cost, and the action dictated by the least cost matching filter is applied, in one example.

For instance, upon receipt of a packet, the packet may be compared to the ACL and an action such as permit, deny, count, redirect or log may be performed as to the packet. Fields from the packets used typically include the source IP address, the destination IP address, layer four protocol, source and destination ports, and possibly some other miscellaneous packet properties. Examples of these fields and sizes are shown in Table 1.

TABLE 1

Fields and sizes often used in the filtering rules in an ACL for classification

| Field | Size (bits) | Comment |
| --- | --- | --- |
| Type/protocol | 4-8 | Such as IP, UDP etc . . . |
| Source IP address | 32 | |
| Destination IP address | 32 | |
| Source Port Number | 16 | |
| Destination Port Number | 16 | |
| Misc. | 4-8 | Such as established, echo . . . |
| Total | 104-108 | |

Usually, rules contained within an ACL are presented in a list, a sample of which is shown below:
permit tcp any any established
permit udp 10.35.0.0/16 10.50.6.128/26 ranges snmp snmptrap
deny tcp 10.21.133.0/24 31.50.138.141 eq 3306

Based on sample, conventional ACL lists provided by industry, ACL lists have ranged from a few entries (tens of rules) to a few thousands of filtering rules, as shown in Table 2.

TABLE 2

Example of sizes of ACLs

| Source | Size (entries) | Comment |
| --- | --- | --- |
| AOL | 2814 | Particularly long example |
| UCR | 361 | Problematic for memory in methods like RFC and HiCuts |
| MFN140 | 153 | Typical |
| MFN112 | 114 | Typical |
| EBORN8 | 33 | Short list |

The most used format for an ACL list is that given by Cisco Systems, in which the rules are given in a linear list, and the first matching rule is applied to a received packet. In this example, the ordering number in the list is used as the implicit filter cost.

Simplest hardware implementations use ternary CAMs (content addressable memory). Rules are stored in the CAM array in the order of decreased priority. Simple and flexible, ternary CAMs are fairly expensive and power hungry. However, 64K×128 ternary CAMs may be available.

Recursive Flow Classification (RFC), as described in "Packet Classification on Multiple Fields," Proceedings of Sigcomm, Computer Communication Review, Vol. 29, No. 4, pages 147-160, September 1999, by P. Gupta and N. McKeown, is another hardware mappable method, believed to be used in existing implementations, including by Cisco Systems and Lucent Technologies. See also T. V. Lakshman and D. Stidialis, "High Speed Policy-based Packet Forwarding Using Efficient Multidimensional Range Matching," Proceedings of ACM Sigcomm 98, October 1998. It is also known as equivalenced cross-producing. The method can be pipelined, and lends it self to an efficient hardware implementation using considerable memory, typically implemented in DRAM. However, without pushing the technology envelope, classifiers with thousands of rules can be implemented and achieve OC192 rates for 40 Byte packets. In this method, all fields of the packet header is split up into multiple chunks, which are used to index into multiple memories. The contents of each memory is precomputed so as to compress regions that could fall into similar rule sets. Recursive recombination of the results and subsequent lookups finally yields the best matching rule.

A number of hash methods exist, such as the Tuple Space Search, described in V. Srinivasan, S. Suri and G. Vargese, "Packet Classification using Tuple Space Search", Proceedings of ACM Sigcomm, pages 135-146, September 1999. In this example, rules have to be initially partitioned into bins which uniquely identifies lengths of prefix specified in each dimension of the rule, and each of these bins are subsequently hashed. An analysis of the available ACL lists indicated that the number of bins are relatively large, and since each bin needs be searched and the results combined, there would not be considerable improvement over a linear search.

Another technique uses a grid of tries, as described in V. Srinivasan, S. Suri, G. Vargese and M. Valdvogel, "Fast Scalable Level Four Switching," Proceedings of SIGCOMM 98, pages 203-214, September 1998. In this example, a method generalizes the standard one dimensional trie search solution to two dimensions. Further work, described in L. Qiu, S. Suri, G. Vargese, "Fast Firewall Implementations for Software and Hardware-based Routers," Technical Report MSR-TR-2001-61, www.research.microsoft.com, showed how to extend a trie search to multiple dimensions, and to apply pruning, compression and selective duplication to balance the memory and throughput constraints. Unfortunately, backtracking may be difficult to implement in a forwarding engine.

Also, a method exists called Hierarchical Intelligent Cuttings (HiCuts) is described in Pankaj Gupta and Nick McKeown, "Packet Classification using Hierarchical Intelligent Cuttings," IEEE Micro, pages 34-41, Vol. 21, No. 1, January/February 2000. HiCuts is a tree based approach that partitions the multi-dimensional search space guided by heuristics. Each end node of the tree stores a small number of rules that are then sequentially searched to find the best match. Associated with each internal node is a cut defined as a number of equal size interval that a particular dimension is partitioned into, and this is performed recursively on the child nodes at each level.

It is also possible to recast classification as a problem in computational geometry, such as the "point location", "ray tracing" or "rectangle enclosure" problem. An example is described in F. Preparata and M. I. Shamos, "Computational Geometry: an Introduction," Springer-Verlag, 1985. For non-overlapping regions multiple dimensions, there are results that allow trade-off of query time with storage. Unfortunately, none of these methods perform well for both storage requirements and query time, nor can these results be easily generalized to the case of overlapping regions which is the case for ACL classification.

Accordingly, as recognized by the present inventor, what is needed is a method for performing a lookup of a packet against an access control list that is memory efficient. It is against this background that various embodiments of the present invention were developed.

SUMMARY

In light of the above and according to one broad aspect of one embodiment of the present invention, disclosed herein is a method for performing a lookup of a packet against an access control list. In one example, the method includes receiving an access control list, partioning said list into two or more complementary sets, and for each set, forming a tree having one or more end nodes including filtering rules, and internal nodes representing decision points, thereby forming at least two trees. In one example, when a packet arrives, the two or more trees are traversed using the packet header information, wherein the decision points in the internal nodes are used to guide the packet selection down the trees to an end node.

Other embodiments of the invention are disclosed herein. The foregoing and other features, utilities and advantages of various embodiments of the invention will be apparent from the following more particular description of the various embodiments of the invention as illustrated in the accompanying drawings and claims.

DETAILED DESCRIPTION

Disclosed herein is a method to implement a tree based ACL lookup process that can be used with a forwarding engine or network processing unit of a router, such as disclosed in Ser. No. 10/177,496 entitled "PACKET ROUTING AND SWITCHING DEVICE" the disclosure of which is hereby incorporated by reference in its entirety. Embodiments of the present invention have the advantage that they may avoid the data dependant memory explosion seen in previous methods such as RFC and HiCuts, and use simple, concisely represented decisions to be made at each decision node. Testing of embodiments of the present invention and benchmarking against a number of ACL lists indicates that lists with thousands of filtering rules (FRs) can be implemented with efficient memory utilization and computation time similar to that required for a lookup.

In one embodiment, the methods disclosed herein partition data into two or more sets, each of which has an efficient tree based representation, whereas the original set may not have an efficient representation. Further, decision nodes are chosen in the tree in a manner which is efficient to represent and which yields good partitioning.

Figure 1:
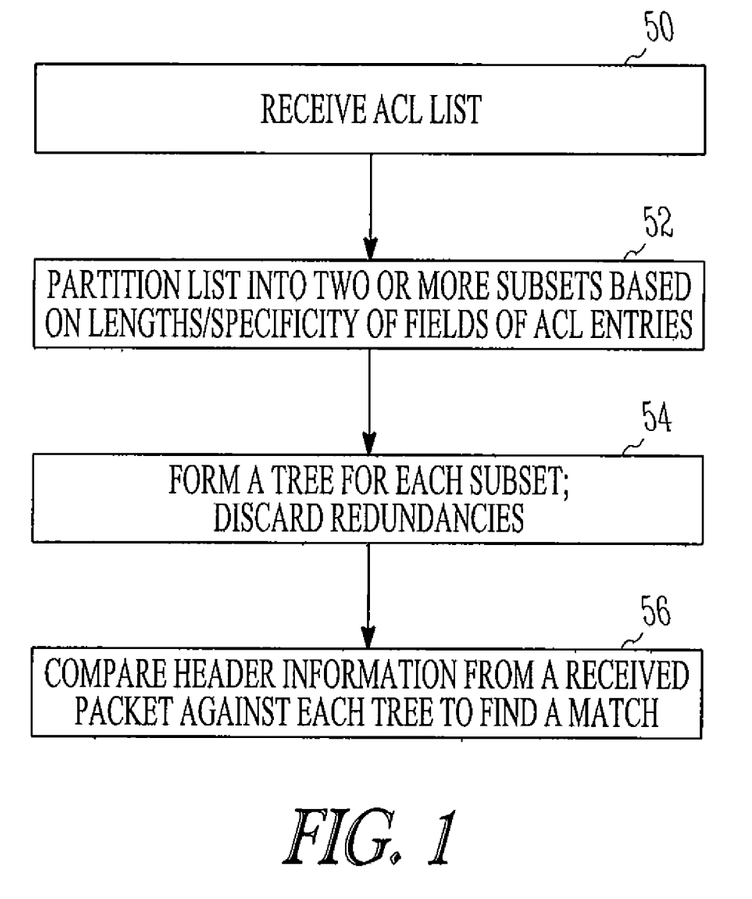
FIG. 1 illustrates an example of logical operations for performing tree based lookups, in accordance with one embodiment of the present invention.

In one embodiment, the method includes the operations shown in FIG. 1. At operation 50, an ACL is received, and at operation 52, the ACL list is partitioned into two or more complementary sets (or, alternatively, skewed sets) based on the source IP and destination IP prefixes/masks (or, alternatively, based on other fields of the ACL entries). This partitioning produces two lists that produce trees that are much more memory efficient than a single tree constructed with the original set. At operation 54, a tree is constructed with each of the sets (i.e., two or more trees are formed), where end nodes consist of a short list of degenerate filtering rules, and internal nodes represent decision points. During the tree construction, these decision points are used to partition the filtering rules into smaller and smaller sets. The comparison criteria is specially selected according to a metric that attempts to both balance the tree, as well as prevent filter rule duplication or redundancy (it is this duplication that could cause memory explosion). This process is iterated until the list of filter rules (FRs) at a node becomes degenerate (i.e., no decision criteria can further partition the filter rules such that both child nodes have a strict subset).

At operation 56, when a packet arrives, the two or more trees are traversed. The decision points in the internal nodes are now used to guide the packet selection down the tree to an end node. The least cost match is selected from the filtering rules residing at the end nodes (typically left with only a few filters that are then searched linearly).

The operations of FIG. 1 are described herein. These operations and the process described herein may be used by a forwarding engine or other portion of a router to form a set of trees which may be used to compare information from received packets in order to process the packets received.

The entries of the ACL list may contain IP address information with respect to the FRs, and this IP address information may be represented using prefixes or masks. A prefix is a shorthand expression of an IP address or a range of IP addresses. An IP address is comprised of four eight bit values separated by periods. In one example, a prefix may include an address portion and a mask portion. The address portion specifies a 32 bit value, while the mask portion specifies a number of bits that are relevant in interpreting the address portion of the prefix. In one example, the mask portion of a prefix specifies the number of left most bits of the address portion which are relevant, with the remaining bits being irrelevant or "don't cares." For instance, the prefix 1.1.0.0/16 represents IP addresses in the range of 1.1.0.0/32 through 1.1.255.255/32.

Building an Efficient Tree

In one example, a tree is built by recursively partitioning the filtering rules of an ACL at each internal decision node. This method is similar to that of HiCuts in that it is a tree based approach that partitions the multi-dimensional search space guided by heuristics, while each end node of the tree stores a small number of rules that are then sequentially searched to find the best match. However, the decision node heuristic is very different in that bit pivot points are used in the Source and Destination IP fields (specified as prefix/mask) as opposed to equal ranges: bit pivots can be more efficiently represented in memory, which may be important depending on the particular implementation of the forwarding engine.

Consider the sample ACL below, with only one dimension shown for simplicity. Without loss of generality, a shorthand prefix/mask is used to represent the filter match rule.

TABLE 3

Example ACL list with rules in one dimension

| NAME | Match Rule |
|---|---|
| FR1 | 01* |
| FR2 | 0010* |
| FR3 | 111* |
| FR4 | 000* |
| FR5 | 0* |

Figure 2:
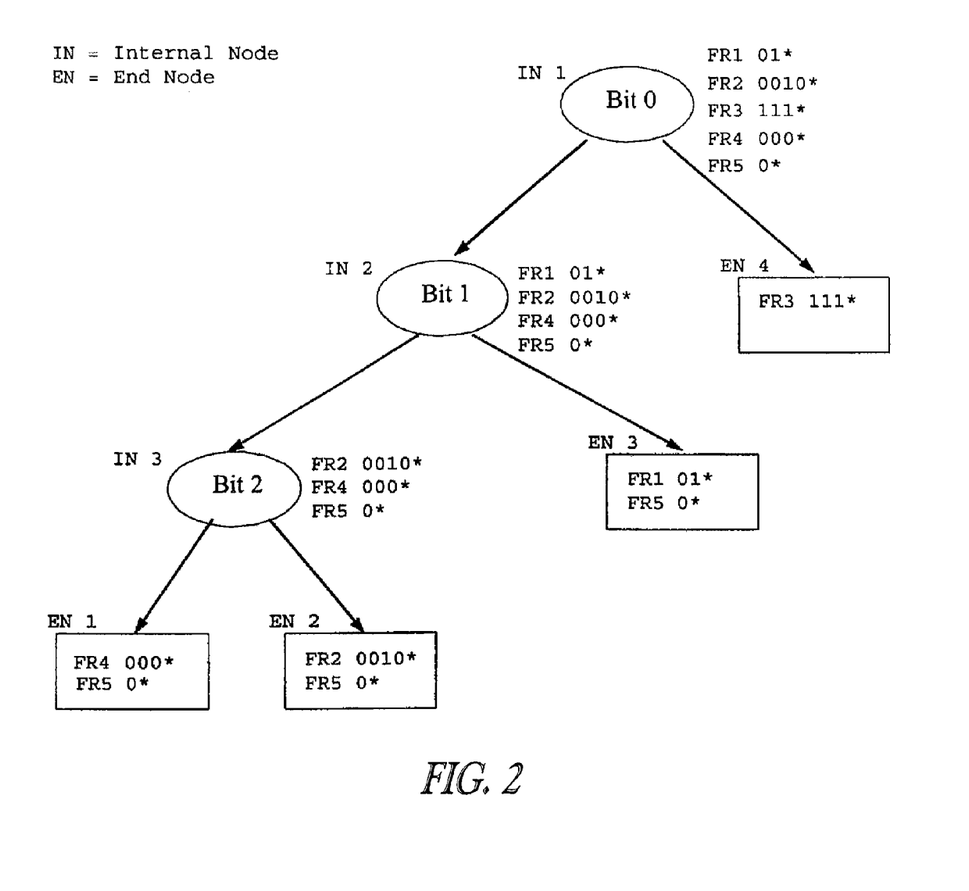
FIG. 2 illustrates an example of a tree.

To build a tree, a choice exists to partition using Bit 0, 1, 2 or 3 of the rule. If the bits are followed sequentially as is done in a trie, this results in the tree shown in FIG. 2. By first considering Bit 0, the filtering rules are partitioned into two sets, one containing only 1 rule, the other 4. By next considering Bit 1, the set of 4 filtering rules may be partitioned into two sets, one containing 3 while the other 2. At this point, FR5 has to be replicated. The resulting tree is 4 levels deep, contains 3 internal tree nodes (IN 1, IN 2 and IN 3) and 4 end nodes (EN 1 . . . EN 4), as shown in FIG. 2.

Figure 3:
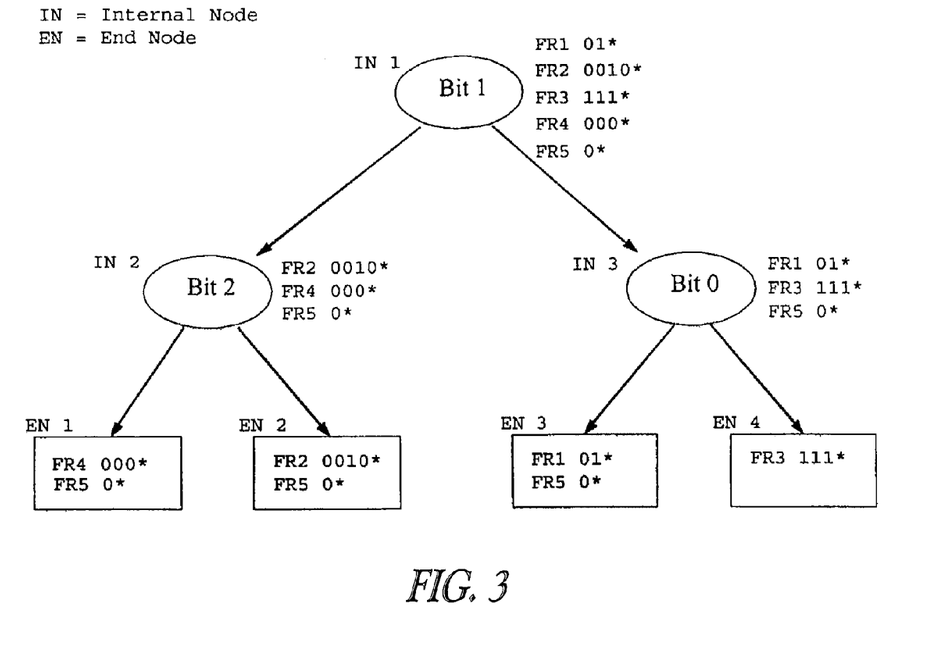
FIG. 3 illustrates an example of a tree.

However, by considering Bit 1 first, the filtering rules may be partitioned into sets containing 3 and 3 respectively (see first level of tree in FIG. 3). Note that again FR5 must be replicated to fall in both sets, as Bit 1 is wild carded in it's rule field.

Picking decision points with which to partition can be summarized by two goals:

a) Pick decision points that partitions the ACL list at that point into as even groups as possible, with the aim of keeping the tree as flat as possible.

b) Pick decision points that minimize the number of replicated FR entries, with the aim of minimizing the memory utilization.

Often these goals will be at odds with each other, and a trade-off must be made. This trade-off was made by the following evaluation function: All choices of partitioning the ACLs are then considered. For each choice the ACLs considered are counted if they would end up in the "LEFT" branch only, the "RIGHT" branch only, or need to be replicated to "BOTH" branches. A score of ALL*ALL-LEFT*RIGHT+ BOTH*BOTH is tabulated for each choice, and the choice with the minimum score was chosen.

Many other trade-off functions were considered, but the above function yielded the most consistent good results. This function evaluated for the ACLs at the root of the tree is shown below:

TABLE 4

Example Scoring at root of ACL tree.

| Candidate bit | LEFT Count | RIGHT Count | BOTH Count | Score |
|---|---|---|---|---|
| 0 | 4 | 1 | 0 | 21 |
| 1 | 2 | 2 | 1 | 22 |
| 2 | 2 | 1 | 2 | 27 |
| 3 | 1 | 0 | 4 | 41 |
| all others | 0 | 0 | 5 | 50 |

Figure 4:
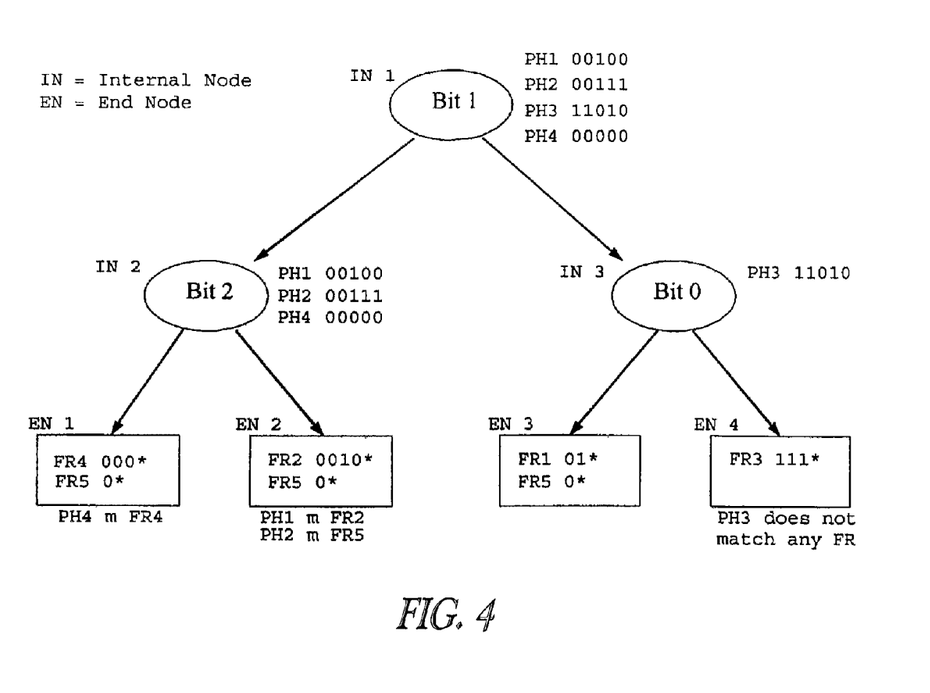
FIG. 4 illustrates an example of a tree.

Finally, consider the classification of four example packet headers (PH1 . . . PH4), using the constructed tree in FIG. 4.

When the packet header arrives at a given end node, it is compared with the FRs stored at the end node in order to determine a match, as the tree traversal only serves to narrow down the number of FRs against which the packet header must be compared, but does not do the actual packet classification. This is evident in the case of packet header PH3 shown in FIG. 4, which at end node EN4, does not match the only FR associated with the node.

For fields that are specified as a range as opposed to the prefix/mask format, the decision node specifies "<X" where X is some integer in the field range. FRs with a specified range <X will be mapped to the left, with a range >=X will be mapped to the right, and a range that spans X will have to be replicated. An alternative implementation would be the use of bit comparisons instead of range comparisons for port numbers. Such implementation may be more involved, but will have benefits of actual decision node mapping to memory.

Complementary Trees

Very often the fields of Table I are specified with different degrees of precision. Consider the 6 FRs in Table 5 in which the source and destination addresses are limited to 3 bits for simplicity. If any bit in either the source (or destination) is used in a decision node, half of the FRs have a corresponding wildcard in that position, resulting in these FRs being replicated.

TABLE 5

Worse case memory example

| NAME | Source IP | Destination IP |
|---|---|---|
| FR1 | 001 | * |
| FR2 | 010 | * |
| FR3 | 101 | * |
| FR4 | * | 110 |
| FR5 | * | 010 |
| FR6 | * | 000 |

Figure 5:
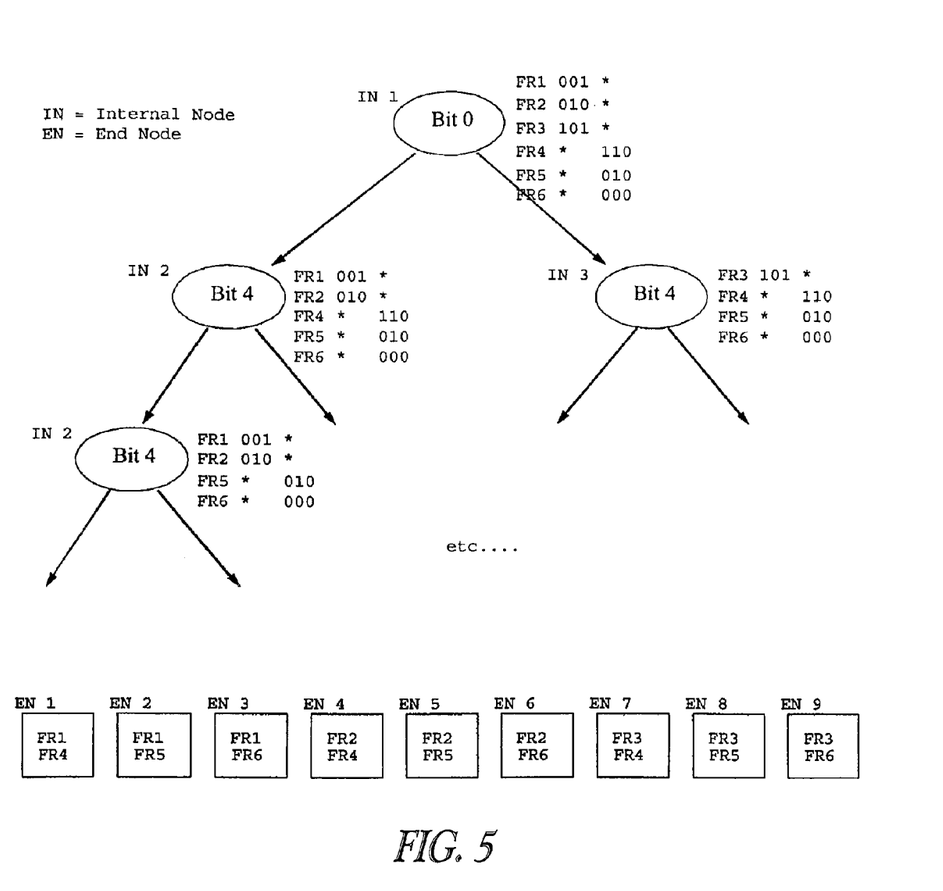
FIG. 5 illustrates an example of a tree.

Following the tree construction method described above with reference to building and efficient tree—but where only one tree is built—this would result in the tree of FIG. 5 with 9 end nodes, with 2 FR entries per end node (16 total stored), and 8 internal nodes.

Figure 6:
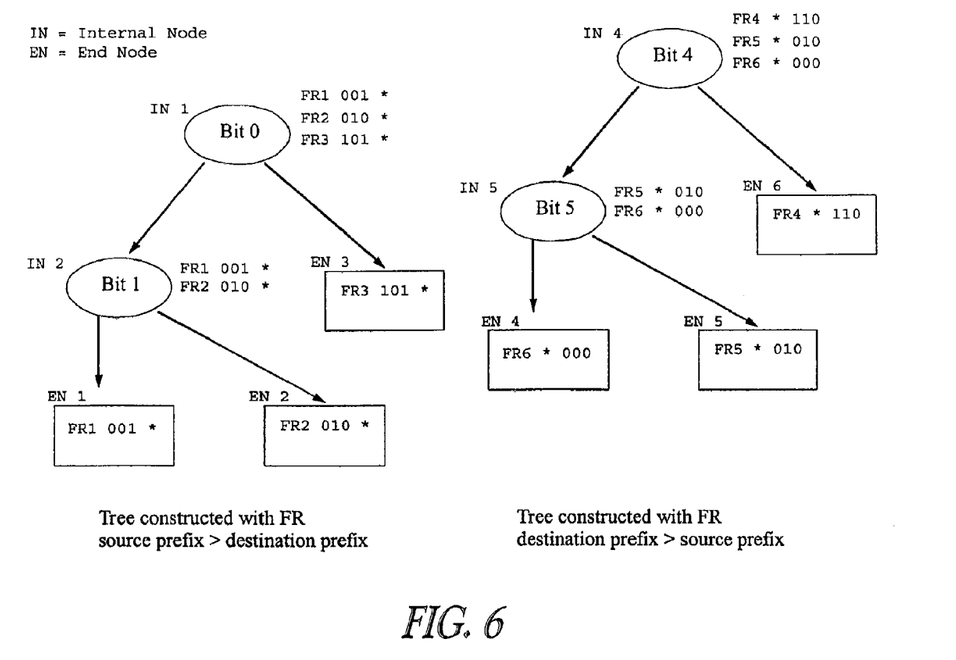
FIG. 6 illustrates an example of two complementary trees, in accordance with one embodiment of the present invention.

If instead, in accordance with the present invention, these entries of this example were proportionately partitioned into two sets and two trees built in accordance with embodiments of the present invention, this results in 6 end nodes, with a single FR entries per end node (6 total stored), and 4 internal nodes, as shown in FIG. 6.

In the general case, up to N complementary trees could be required if there are N dimensions in the original data set. However, for all the data sets that which may be accessed, two trees are sufficient to give good results.

The elements of each tree may be chosen as follows. In order to chose which tree a FR belongs, a comparison is made between the source and destination address prefix lengths. Those with (source prefix>destination prefix) will be placed on one tree, and those with (destination prefix>source prefix) on the second. If the prefix is of the same length, then two approaches are evaluated. The first, called Balanced Complementary Trees, aims to keep the same number of FRs on both trees, while the second, called Skewed Complementary Trees, aims to make one of the trees as small as possible. Another variation of this that may yield better results would be to make a decision based on the other FR fields, such as the port or protocol.

There is one disadvantage of the complementary tree approach as follows: Consider a packet with PH 010 010. With a single tree, one may end up at end node 5, and realize that it matches FR 2 first, and so that rule applies (if the FR order are preserved in leaves). However, in the two complementary trees, it matches the FR 2 in end node 2, and FR 5 in end node 5. Additional information of the weights of FR 2 and FR 5 may be used in order to determine which rule to follow.

Results

Results are presented for a single tree, and the two variations of the complementary tree methods. Although in general the single tree method results in a tree that is smaller in depth than the complementary tree methods, the memory utilization is in general much higher. Overall the best performing method is the Skewed Complementary Trees method.

understanding of the limitations of the method. None of the data sets evaluated fell into any of these categories.

Very Deep Tree

ACLs that contain FRs with patterns in the source/destination IP address, such as shown here, can construct an example with 64 FRs that require a tree 64 deep:

1*
01*
001*
0001*

ACLs with pattern in the source/destination IP address, such as shown here, can construct an example with 64 FRs that require an end node with 64 entries (many degenerate FRs in end node, requiring serial evaluation):

111111 accept
11111 deny
1111 accept
111 deny

Mapping to Forwarding Engine Memory

The following is one embodiment of how the ACL decision trees could be mapped to a memory of a forwarding engine such as the forwarding engine referenced above.

Internal Tree Nodes

Internal tree decision nodes can be mapped to 32 bits fairly easily for pointer lengths up to 12 bits. For pointer values of more than 16 bits, the higher order bits for nodes representing port number comparisons are taken from parent nodes, or through the use of bit comparisons instead of range comparisons for port numbers. In the following analysis, assume that each internal node consumes 4 bytes of memory.

TABLE 6

Results for various methods

| | Single Tree | | | Two Balanced Complementary Trees | | | Two Skewed Complementary Trees | | |
|---|---|---|---|---|---|---|---|---|---|
| Source | Max/Min/Ave Depth | Total Nodes | Num FR Entries | Max/Min/Ave Depth | Total Nodes | Num FR Entries | Max/Min/Ave Depth | Total Nodes | Num FR Entries |
| AOL (2814) | 20/8/14.7 | 11251 | 13964 | 15/7/11.5 16/6/11.7 | 7284 | 6234 | 16/9/12 15/5/10.5 | 7386 | 4785 |
| UCR (361) | 23/5/17.2 | 25617 | 49639 | 15/6/10.8 9/5/6.2 | 1322 | 1636 | 15/5/10.4 10/4/7.2 | 1054 | 1318 |
| MFN 140 (153) | 10/7/8.1 | 257 | 427 | 7/3/5.4 8/5/6.5 | 254 | 270 | 6/3/4.5 8/6/6.6 | 256 | 232 |
| MFN 112 (114) | 11/5/8.5 | 277 | 193 | 8/5/6.4 7/4/5.2 | 242 | 134 | 9/5/6.7 6/3/4.6 | 240 | 133 |
| EBORN8 (33) | 7/4/5.9 | 61 | 40 | 1/1/1 6/3/4.8 | 60 | 40 | 0/0/0 7/4/5.9 | 62 | 40 |

Total nodes for each tree counts both the internal nodes, as well as the leaf nodes. A total of 36 accesses to forwarding table RAM (FTSRAM) would have been adequate in the above data sets to complete a search. A single recirculation in the forwarding engine referenced above provides 36 access to FTSRAM, and so would be adequate for any of the ACL lists above.

Known Worse Case Pathological Cases

There are pathological cases that cause either the tree to be very deep, or results in many degenerate ACLs at the end node. These examples are shown here, which help provide an End Nodes The end node can be mapped to FRs in much the same manner as is currently implemented today FRs using a list based search. Currently, 4 32 bit words are utilized per FR, and there is only a single obvious spare bit.

However, some number of extra bits will have to be found to indicate the FR weight, so the result from the appropriate tree can be selected. Three bits can be saved per IPaddress/mask specification with a slightly different encoding as is shown in Table 7 using the IP destination address as an example:

TABLE 7

Representing the IPaddress/mask in 35 bits.

| Field | Length | Interpretation |
|---|---|---|
| IpDstShift | 3 | If 0-6, represents the number of bits to shift right the IP Destination Address is right shifted before being stored into IpDestinationAddress. If 7, then the first 6 bits of the IpDestinationAddress is used to represent the number of bits to that the IP Destination Address is right shifted before being stored. |
| IpDestinationAddress | 32 | When IpDstShift in range [0 . . . 6], then this represents the IP Destination Address right shifted by this number. |
| IpDestinationAddress | 32 | When IpDstShift = 7, then the first 6 bits of the IpDestinationAddress is used as the shift index. The remaining 26 bits represents the Ip Destination Address right shifted by this index |

More precisely in the forwarding engine referenced above in the co-pending application Ser. No. 10/177,496 entitled "PACKET ROUTING AND SWITCHING DEVICE," in one example, 1024 word block per LxU stage major block may be dedicated for ACLs in software, which translates to 12,228 words total (12 stages), and 49152 bytes. It takes 4 words per FR (ACL list item), for a total of 3072 items. Because of memory allocation and organization constraints (e.g., lists not divisible by 3 wastes some memory), effective usage will not be 100%.

However, these 6 bits combined with the one obvious spare bit will allow only 7 bits to specify the FR weight. If this method is used, and if restricted to 4 32 bit words, some additional thought needs to be given in order to extract additional bits for the weight field.

In the case where there are multiple FRs in an end node, these FRs are degenerate, and as such are closely related. Typical entries from end node are shown in the two following Tables 8-9:

TABLE 8

An example of entries from a worse case end node from the UCR ACL list.

| Weight | action | type | source IP/mask | destination IP/mask | Source Port | Destination Port |
|---|---|---|---|---|---|---|
| 62 | deny | any | 0.0.0.0/0 | 129.45.100.225/32 | any | any |
| 313 | permit | any | 0.0.0.0/0 | 129.45.100.0/24 | any | 933 |
| 348 | deny | any | 0.0.0.0/0 | 129.45.100.0/24 | any | <1024 |
| 352 | permit | any | 0.0.0.0/0 | 129.45.100.0/24 | any | any |

TABLE 9

Another example of entries from a worse case end node from the UCR ACL list.

| Weight | action | type | source IP/mask | destination IP/mask | Source Port | Destination Port |
|---|---|---|---|---|---|---|
| 91 | permit | any | 209.249.96.0/24 | 172.17.230.0/25 | any | any |
| 94 | deny | any | 0.0.0.0/0 | 172.17.230.0/32 | any | any |
| 95 | permit | any | 0.0.0.0/0 | 0.0.0.0/0 | any | any |

In particular, few fields need to be re-evaluated as the list is traversed. In Table 8, after FR with weight 62 is evaluated, if it fails, only the destination IP/mask and the Destination Port need to be re-evaluated. If FR with weight 313 fails, then only the Destination Port now needs to be re-evaluated etc. It should be possible to encode these with an average of 2 32 bit words per FR. Lastly, common wildcards could probably be encoded in a more compressed representation. In the following analysis, assume that each FR consumes 16 bytes of memory if it is the first entry in the end node, else 8 bytes for subsequent FR entries in the end node.

Memory Considerations

Using the estimates above for memory utilization in the end nodes and internal nodes, the approximate the memory requirements for each ACL list in bytes is computed in Table 10. This results in 4*(Internal Nodes+2*(End Nodes+FR entries)) bytes for a given tree.

TABLE 10

Example ACLs memory utilization

| Source | Size | Internal Nodes | End Nodes | FR Entries | Memory (K Bytes) | Bytes per FR |
|---|---|---|---|---|---|---|
| AOL | 2814 | 3692 | 3694 | 4785 | 80.67 | 29.4 |
| UCR | 361 | 526 | 528 | 1318 | 16.48 | 46.7 |
| MFN140 | 153 | 127 | 129 | 232 | 3.32 | 22.1 |
| MFN112 | 114 | 119 | 121 | 133 | 2.45 | 22 |
| EBORN8 | 33 | 30 | 32 | 40 | 0.68 | 21.1 |

From the data, budget of 32 bytes per FR may be made in an ACL list.

To make trees shorter, more than one bit at a time may be considered in the source and destination IP fields, in a similar way that this is done in the lookup. This may help speed up the search by up to 40%, but will increase memory by about 25%.

Accordingly, as discussed above, tree based ACL computation as disclosed herein is possible on a forwarding engine of a router, and would allow lists of many thousand entries to be processed with, for instance, 3 strokes through the LxU of the forwarding engine referenced above (i.e., can be done with one recirculation). This means that a tree based ACL lookup can be done with I-mix at line rate.

In one example, the methods described herein may be coded in a similar manner as used for packet lookup operations (i.e., IPv6 lookup).

In a tree based implementation, each FR of an ACL would consume on average 32 bytes of storage. Current list based implementations require 16 bytes of storage per ACL. Hence, the total number of ACLs supported for a given memory size will be about half for a tree based implementation relative to the current list based implementations.

In one example, using ¼ of the memory (i.e., FTSRAM) for this application will result in the support of up to 16K FRs per input line card. This will not allow 3K entries for every one of 40 Ethernet ports on a given Linecard today (would use about 4 MBytes). However, given a certain memory limit, the number of total FRs that a line card can support can be specified, and a customer can decide how to allocate them between input ports, if desired.

In one example, doing output ACLs at the input of a forwarding engine as described in the co-pending application Ser. No. 10/177,496 entitled "PACKET ROUTING AND SWITCHING DEVICE" with only one recirculation may not be feasible due to memory con-straints. By doing two recirculations, the first for the input ACL lookup, the second for the output ACL lookup, a certain level of output ACLs can be supported at the expense of memory. In addition to the input ACL lists, and output ACL list will have to be present for every output port that performs ACLs. This could result in 40 input ACL lists, and 480 output ACL lists per Line Card. The total number of FRs decided upon based on memory could be shared among these lists. Simulation results indicate that even with 2 recirculations, I-mix could be supported at line rate with a forwarding engine such as referenced above.

In order to support ACLs at line rate for 40 Byte packets, other forwarding engines may use an additional 36 accesses to FTSRAM in order to run the tree based ACL method without recirculation. This can be accomplished either by adding more pipeline stages, increasing the clock frequency to allow more "strokes" through the pipeline, or by a combination of both (i.e., double the number of accesses).

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to various embodiments thereof, it will be understood by those skilled in the art that various other changes in the form and details may be made without departing from the spirit and scope of the invention.

What is claimed is:

1. A method for performing a lookup of a packet against an access control list, comprising:
   receiving an access control list including a set of filtering rules;
   identifying a decision point to partition the access control list into two or more complementary sets, wherein the decision point is identified such that the access control list is partitioned into nearly even groups, and wherein the decision point is identified to reduce the number of replicated filtering rules and minimizing memory utilization;
   forming a tree for each complementary set, wherein the tree has one or more end nodes including a subset of filtering rules, and an internal decision node representing the decision point; and
   traversing the two or more trees when a packet arrives and comparing header information from the packet against each of the two or more trees and determining a match, wherein the decision point in the internal decision nodes is used to guide the packet down the trees to an end node that includes at least one filtering rule that is included in the set of filtering rules.

2. The method of claim 1, comprising:
   sequentially searching the subset of filtering rules at the end nodes to find the best match.

3. The method of claim 1, comprising:
   recursively partitioning the set of filtering rules at each of the internal decision nodes.

4. The method of claim 1, comprising:
   determining the tree to which a particular filtering rule belongs based on comparing the source and destination address prefix lengths.

5. The method of claim 4, further comprising:
   assigning the filtering rules having source prefix lengths greater than destination prefix lengths in a first tree.

6. The method of claim 5, further comprising:
   assigning the filtering rules having destination prefix lengths greater than source prefix lengths in a second tree.

7. The method of claim 1, further comprising:
   determining the two or more trees to which a particular filtering rule belongs based on a particular port to which the packet is being forwarded.

8. The method of claim 1, further comprising:
   determining the tree to which a particular filtering rule belongs based on the protocol associated with the packet.

9. A network device comprising:
   at least one processor;
   a memory in communication with the at least one processor, the memory including logic encoded in one or more tangible media for execution and when executed operable to:
   receive an access control list including a set of filtering rules;
   identify a decision point to partition the access control list into two or more complementary sets, wherein the decision point is identified such that the access control list is partitioned into nearly even groups, and wherein the decision point is identified to reduce the number of replicated filtering rules and minimizing memory utilization;
   form a tree for each complementary set, wherein the tree has one or more end nodes including a subset of filtering rules, and an internal decision node representing the decision point; and
   traverse the two or more trees when a packet arrives and comparing header information from the packet against each of the two or more trees and determining a match, wherein the decision point in the internal decision nodes is used to guide the packet down the trees to an end node that includes at least one filtering rule that is included in the set of filtering rules.

10. The network device of claim 9, further comprising logic encoded in one or more tangible media for execution and when executed operable to:
    sequentially search the subset of filtering rules at the end nodes to find the best match.

11. The network device of claim 9, further comprising logic encoded in one or more tangible media for execution and when executed operable to:

recursively partition the set of filtering rules at each of the internal decision nodes.

12. The network device of claim 9, further comprising logic encoded in one or more tangible media for execution and when executed operable to:

determine the two or more trees to which a particular filtering rule belongs based on comparing the source and destination address prefix lengths.

13. The network device of claim 12, further comprising logic encoded in one or more tangible media for execution and when executed operable to:

assign the filtering rules having source prefix lengths greater than destination prefix lengths in a first tree.

14. The network device of claim 13, further comprising logic encoded in one or more tangible media for execution and when executed operable to:

assign the filtering rules having destination prefix lengths greater than source prefix lengths in a second tree.

15. The network device of claim 9, further comprising logic encoded in one or more tangible media for execution and when executed operable to:

determine the tree to which a particular filtering rule belongs based on a particular port to which the packet is being forwarded.

16. Logic encoded in one or more tangible media for execution and when executed operable to:

receive an access control list including a set of filtering rules;

identify a decision point to partition the access control list into two or more complementary sets, wherein the decision point is identified such that the access control list is partitioned into nearly even groups, and wherein the decision point is identified to reduce the number of replicated filtering rules and minimizing memory utilization;

form a tree for each complementary set, wherein the tree has one or more end nodes including a subset of filtering rules, and an internal decision node representing the decision point; and traverse the two or more trees when a packet arrives and comparing header information from the packet against each of the two or more trees and determining a match, wherein the decision point in the internal decision nodes are used to guide the packet down the trees to an end node that includes at least one filtering rule that is included in the set of filtering rules.

* * * * *

UNITED STATES PATENT AND TRADEMARK OFFICE
CERTIFICATE OF CORRECTION

PATENT NO. : 7,536,476 B1
APPLICATION NO. : 10/745067
DATED : May 19, 2009
INVENTOR(S) : Brian D. Alleyne Page 1 of 1

It is certified that error appears in the above-identified patent and that said Letters Patent is hereby corrected as shown below:

On the Title Pg, Item (57), under "Abstract", line 3, delete "partioning" and insert -- partitioning --, therefor.

On the Title Pg, on page 2, Item (56), under "Other Publications", line 5, delete "Heirarchy" and insert -- Hierarchy --, therefor.

On the Title Pg, on page 3, Item (56), under "Other Publications", line 24, delete "A. ," and insert -- P., --, therefor.

On the Title Pg, on page 3, Item (56), under "Other Publications", line 29, delete "Addision-" and insert -- Addison- --, therefor.

On the Title Pg, on page 3, Item (56), under "Other Publications", line 3, delete "_paper.html," and insert -- paper.html, --, therefor.

In column 1, line 30, delete "I," and insert -- 1, --, therefor.

In column 2, line 37, delete "cross-producing." and insert -- cross-producting. --, therefor.

In column 3, line 42, delete "partioning" and insert -- partitioning --, therefor.

In column 6, line 37, delete "I" and insert -- 1 --, therefor.

In column 11, line 13, delete "Linecard" and insert -- line card --, therefor.

In column 11, line 22, delete "con-straints." and insert -- constraints. --, therefor.

Signed and Sealed this

Second Day of February, 2010

David J. Kappos
*Director of the United States Patent and Trademark Office*